United States Patent [19]

Narayanan et al.

[11] Patent Number: 5,110,322
[45] Date of Patent: May 5, 1992

[54] ABRASIVE ARTICLE

[75] Inventors: Kesh S. Narayanan, Holden; Muni S. Ramakrishnan, Northborough, both of Mass.

[73] Assignee: Norton Company, Worcester, Mass.

[21] Appl. No.: 506,059

[22] Filed: Apr. 9, 1990

Related U.S. Application Data

[63] Continuation-in-part of Ser. No. 406,487, Sep. 13, 1989, abandoned.

[51] Int. Cl.⁵ .............................................. B24D 3/02
[52] U.S. Cl. ...................................... 51/309; 51/293; 51/295; 51/298; 51/307; 51/308
[58] Field of Search ................. 51/293, 295, 298, 309, 51/307, 308

[56] References Cited

U.S. PATENT DOCUMENTS

| | | | |
|---|---|---|---|
| 4,314,827 | 2/1982 | Leitheiser et al. | 51/298 |
| 4,623,364 | 11/1986 | Cottringer et al. | 51/309 |
| 4,741,743 | 5/1988 | Narayanan et al. | 51/309 |
| 4,800,685 | 1/1989 | Haynes, Jr. | 51/309 |
| 4,898,597 | 2/1990 | Hay et al. | 51/298 |
| 4,997,461 | 3/1991 | Markhoff-Matheny et al. | 51/295 |

Primary Examiner—William R. Dixon, Jr.
Assistant Examiner—Willie Thompson
Attorney, Agent, or Firm—David Bennett

[57] ABSTRACT

Abrasive article using sintered sol-gel abrasive particles mixed with other particles having greater friability, and carried in a bond.

16 Claims, No Drawings

ABRASIVE ARTICLE

This application is a continuation-in-part of application Ser. No. 07/406,487 filed September 13, 1989 now abandoned.

BACKGROUND OF THE INVENTION

It is well known that the nature and content of the abrasive grains in a bonded abrasive article have significant influence on the grinding performance of such articles. The term "nature", as herein used, refers to chemical composition, morphology, shape, and size for both the individual abrasive grain and any microcystalline components thereof. For example, each grit of the sintered sol gel alumina abrasive grains of Cottringer, et al, (U.S. Pat. No. 4,623,364), is composed of an assemblage of alpha alumina crystallites each no larger than 0.4 microns. The sol gel alumina particles of Cottringer are generally described as "seeded".

Other sol-gel alumina abrasive are described in, for example, U.S. Pat. No. 4,314,827 (Leitheiser et al) and U.S. Pat. No. 4,744,802 (Schwabel). Leitheiser et al describes unseeded and Schwabel seeded sol gel alumina abrasives.

It is found that vitreous bonded articles prepared from sol gel alumina abrasive grits may outperform identical articles prepared from conventional fused alumina abrasive by as much as 600% or more in wheel life and in the ratio of metal removed to wheel wear, while consuming less power and removing metal at a higher rate. However, in organic bonded abrasive articles, sintered sol gel abrasives, while superior to normal fused alumina abrasives, have hitherto not shown the dramatic improvement seen in vitreous bonded articles.

At high grinding pressures, organic bonded abrasive articles wear too rapidly to take advantage of the superiority of the individual sol gel alumina grits and at low force levels not enough pressure is exerted on individual grains to microfracture for self-sharpening.

It is well known in the art that dilution of the abrasive grit portion of bonded abrasive articles with softer more friable particles will increase the cutting rate. Hartmann, in U.S. Pat. No. 1,830,757, teaches a self-sharpening wheel in which friable particles of calcined clay, porous alumina, magnesia or glass, all softer than the abrasive grits, are incorporated to break out during grinding leaving an open, free-cutting grinding face. Similarly, Robie, in U.S. Pat. No. 2,806,772 teaches the use of thin walled balloons, resin micro balloons, porous clay pellets, and other friable particles to provide pore support and increase freedom of cut. Sandmeyer, in U.S. Pat. No. 2,986,850, recognized the unique ability of hollow alumina spheres to serve as both abrasive grit and pore spacer in bonded abrasive articles. Grinding wheels of 100% alumina bubbles, made according to the Sandmeyer patent, wear very rapidly and are only suitable for grinding soft materials such as cork, rubber, fiber board, etc.. Fukada, in U.S. Pat. No. 4,226,602, incorporates pore-forming blowing agents with or without alumina bubbles in a continuously-formed resin bonded abrasive article of improved cutting ability. Zimmer, in South African Disclosure 82/0339, describes resin bonded abrasive articles of less than 14% interconnected porosity containing silane-treated porous support material, including alumina bubbles, and multicellular glass modules. The function of the porous materials in this instance was to prevent slumping during cure and reduce infiltration of water during wet grinding.

Bloecher, U.S. Pat. No. 4,799,939, teaches forming abrasive aggregates particles comprising abrasive particles and glass micro balloons in a phenolic resin bond. These particulate aggregates can then be used to manufacture abrasive products.

Other methods of introducing pores into organic bonded abrasive articles are well known, as exemplified by Pohl, in U.S. Pat. No. 1,986,850 in which uniformly distributed hollow spaces are produced in abrasive bodies by gas evolution and use of soluble or sublimable spheres.

This increase in cutting rate is, however, usually accompanied by a significant increase in the rate at which the abrasive article is worn down. This ratio of the volume of work material removed to volume of abrasive article worn away is known as the "G-ratio". Generally, high G-ratios are clearly preferred but have not hitherto been obtained with conventional abrasive particles.

It has been found that the substitution of friable filler particles such as bubble alumina spheres or softer, more friable, particles for a portion of the sintered sol gel alumina grains not only increases the cutting rate, but decreases the wheel wear for unexpectedly high G-ratios. This is a most unexpected result and runs counter to the teachings of the prior art.

It is, therefore, an object of the present invention to provide an abrasive article in which sintered sol gel alumina abrasive particles are resin bonded and yet provide increased cutting rates with decreased wheel wear.

Another object of the invention is to provide an abrasive article offering the advantages of sintered sol gel alumina abrasive particles without unacceptable wheel wear.

A further object of the invention is to provide an abrasive article combining excellent cutting rate and acceptable wheel wear characteristics with relatively inexpensive material cost.

Another objective of the invention is to provide an abrasive article which, for a given grinding rate, uses less power and is less likely to damage a workpiece metallurgically.

With these and other objectives in view, as will be apparent to those skilled in the art, the invention resides in the combination of parts set forth in the specification and covered by the appended hereto.

SUMMARY OF THE INVENTION

In general, the claims invention relates to an abrasive article comprising sintered sol gel alumina abrasive particles such as those described by Leitheiser, Schwabel, and Cottringer, and friable filler particles, all such particles being bonded in a resinous matrix.

In describing the filler particles as friable it is intended to convey that, when the abrasive article is in use and abrasive forces act upon both the abrasive particles and the friable filler particles, the filler particles are worn away significantly more rapidly than are the abrasive particles. Friable filler particles as the term is used herein include bubble alumina and other filler particles of about the same or greater friability.

Conveniently, the friable filler particles may be present in an amount of up to about 50%, such as from about 5 to 40%, and preferably from 5 to 30% of the total particle weight. Often this can represent from about 20 to 70% and preferably up to about 50% by volume of the particulate material.

It is preferred that each sintered sol gel alumina abrasive particle be made up of a multitude of sintered alpha alumina crystals having a size in the order of 0.4 micron or finer. The most preferred sol-gel alumina particles are those that have been produced by a seeding technique such as that described in U.S. Pat. No. 4,623,364.

The abrasive article may have the form of a wheel or a block or other structure suitable for an abrading use. This is done prior to curing the resinous matrix such that the article has an essentially uniform structure throughout.

DESCRIPTION OF THE PREFERRED EMBODIMENT

The resin bonded abrasive bodies of the invention make use of sintered sol gel alumina abrasive grits together with bubble alumina or other friable filler granules to achieve the fast cutting action well known and expected from such combinations together with an unexpectedly high G-ratio and wheel life. This unexpected combination of properties is of great economic importance since lesser quantities of expensive sol gel alumina abrasive are required to produce high performance grinding wheels and other bonded abrasive bodies.

The abrasive portion of the inventive bodies is selected from seeded or unseeded sol gel alumina grits with the seeded variation being particularly preferred. These may be combined with up to about 70% of other abrasives, such as diamond, CBN, sintered or fused alumina, silicon carbide, zirconia, or sintered or fused alumina-zirconia. These abrasives may be surface treated with hydrophobic compounds, such as silanes, where grinding with water-based coolants is anticipated. Such treatments are well-known in the art. All of the abrasives used in the three examples which follow were treated with 0.2 cc of silane A1102 ™ per pound of abrasive and dried at 150° C. for 24 hours. Silane A1102 ™ was obtained from Union Carbide Corporation, Danbury, Conn.

The abrasive particles are often of irregular shape as result of the way in which they are prepared. This is, however, not essential. Spherical, pyramidal, cylindrical (with an aspect ratio, L/D, of for example 0.5 to 10), cubic or any other configuration may be selected. The abrasive particle sizes employed will depend on end use for which the article is intended. However, commonly abrasive particle grit sizes of from about 10 to about 200 and preferably from about 16 to about 120 such as for example from about 20 to about 60 grit are found to be suitable.

The preferable friable filler particles used in the invention are formed from hollow oxide bubbles such as bubble alumina or other hollow silicate particles but may also comprise solid or porous friable particles such as calcined clay, pumice, feldspar, nepheline syenite and the like, as well as solid and hollow spheres made from an organic polymer or glass.

The friable filler size is preferably the same or less than that of the abrasive particles and, in general, mesh sizes of from 10 to 200 mesh are found to be suitable.

A conventional organic resinous binder may be mixed with a variety of additions or modifiers to bind the abrasive grains and friable grains together. Preferably, the organic binder is a thermosetting phenolic resin with or without modifiers such as rubber or epoxy.

Examples of resins which may be employed include phenoxy, phenol-furfural, aniline-formaldehyde, urea-formaldehyde, epoxy, cresol-aldehyde, urethane, polyester, polyimides resorcinol-aldehyde, urea-aldehyde, melamine-formaldehyde, and mixtures thereof. The preferred resin bond is a phenolic resin, such as a phenol/formaldehyde resole or novalac.

As is well known, there are various inorganic and organic adjuvants which may be put in organic bonded abrasive bodies for improving strength, reducing cost, and most importantly for improving grinding performance. The adjuvants are usually considered to be part of the bond and are in a finely divided state, much smaller than the primary grinding abrasive grits.

Suitable conventional and well known adjuvants include cryolite, fluorspar, iron pyrites, zinc sulfide, magnesia, silicon carbide, sodium chloride, potassium fluoborate, calcium oxide, potassium sulfate, copolymer of vinylidene chloride and vinyl chloride (Saran B), polyvinylidene chloride, polyvinyl chloride, other fibers such as glass fiber, sulfides, chlorides, sulfates, fluorides and mixtures thereof.

The abrasive articles of the invention are made by forming a mixture of the abrasive particle(s) and the friable filler particles with the resin in its uncured state, and thereafter forming the mixture into the desired shape and curing the resin. It is often, also, desirable to fire the article to drive off volatile material and to harden it. Typically, the shape of the abrasive article will be an abrasive wheel or other abrasive tool.

The invention is now further described with reference to the following Examples which are for the purpose of illustration only and are intended to imply no essential limitation to the shape of the invention itself.

EXAMPLE 1

A series of nine cold-pressed resin bonded wheel compositions were prepared as follows for grinding tests. The batch compositions are given in Table 1.

TABLE 1

| | BATCH WEIGHTS IN POUNDS | | | | | | |
| --- | --- | --- | --- | --- | --- | --- | --- |
| | Wheel | | | | | | |
| | A (c) | C | D | E | G | J | K |
| Density | 2.54 | 2.38 | 2.04 | 2.17 | 2.11 | 2.24 | 1.82 |
| 46 grit size seeded sol-gel alumina abrasive | 0 | 6.33 | 7.39 | 11.57 | 7.14 | 11.21 | 13.77 |
| 46 grit size fused alumina abrasive | 20.11 | 10.58 | 0 | 0 | 0 | 0 | 0 |
| Bubble alumina 0.5–1.0 mm dia. | 0 | 0 | 0 | 0 | 0 | 0 | 3.60 |
| 46 grit size | 0 | 2.99 | 11.65 | 7.83 | 11.27 | 7.58 | 0 |

TABLE 1-continued

| | BATCH WEIGHTS IN POUNDS | | | | | | |
|---|---|---|---|---|---|---|---|
| | Wheel | | | | | | |
| | A (c) | C | D | E | G | J | K |
| Syenite 333 TM | | | | | | | |
| Varcum 29717 TM powdered phenolic resin | 2.30 | 2.46 | 2.87 | 2.70 | 3.79 | 3.57 | 4.25 |
| Varcum 2930 TM liquid phenolic resin | 0.37 | 0.40 | 0.46 | 0.44 | 0 | 0 | 0 |
| Cryolite −200 mesh | 2.10 | 2.24 | 2.62 | 2.46 | 2.46 | 2.32 | 2.76 |
| Carbon black | 0.05 | 0.05 | 0.06 | 0.05 | 0 | 0 | 0 |
| Chloroflo 40 TM | 50 cc | 50 cc | 50 cc | 50 cc | 40 cc | 0 | 0 |
| Furfural | | | | | 165 cc | 156 cc | 191 cc |
| Quicklime | | | | | 0.54 | 0.51 | 0.61 |

(c) indicates a prior art wheel for comparison.

Varcum 2930 TM Oxy Chem Corporation, Niagara Falls, N.Y.

Varcum 29717 TM is a rubber modified powdered phenolic resin available from Varcum Division, Oxy Chem Corporation, Niagara Falls, N.Y.

Chloroflo 40 TM is a liquid chlorinated paraffin obtainable from Dover Chemical Company, Dover, Ohio.

Standard mixing procedures for the preparation of resin bonded abrasive mixes were followed, i.e., the abrasive and any friable filler particles were placed in a rotating mixing pan and wet with liquid resin or furfural before the introduction of the powdered resin and any adjuvants. After five minutes of mixing the batch was ready to press into wheels. Wheels were pressed to 5⅛ inch diameter (130.2 mm) with 1 inch (25.4 mm) hole and 0.563 inch (14.3 mm) in thickness using the proper weight of mix to provide the correct final density. In each case this density was calculated to yield 52 volume percent of abrasive or abrasive plus friable filler particles. The wheels were cold pressed. After pressing the wheels were placed on alumina batts and cured in a convection-type electric oven at 175° C. for 15 hours. The cured wheels were then finished to 5 inches (127 mm) in diameter and hole was reamed to 1¼ inches (31.8 mm) in diameter.

The prepared wheels were then tested in a slot-grinding mode on 4340 steel blocks, hardened to Rc48, 16⅛ inches (409.6 mm) in length. For this test the face of each wheel was reduced to ¼ inch in width (6.35 mm) and slots were ground lengthwise into the 4340 steel block using three separate infeeds: 0.5 mils, 1.0 mils and 2.0 mils (0.0126 mm, 0.0254mm and 0.1016 mm). Total depth of infeed for each test was 100 mils (2.54 mm). The test was conducted on a surface grinder with table speed set at 50 feet per minute (15.24 meters per minute) and wheel speed set at 6500 surface feet per minute (33.02 meters per second). The test was conducted using E55 TM coolant (available from the White & Bagley Co., Worcester, Mass.), diluted with 40 parts of city water. Careful measurements were made of wheel wear and metal removal as well as the power consumed in each slot grind.

The results of the grinding test are given in Table 2 as follows:

TABLE 2

| | SLOT GRINDING TEST RESULTS | | | | |
|---|---|---|---|---|---|
| Friable/ Filler | Wheel Marking | Feed (mils) | G Ratio* (S/W) | Relative* Power G Ratio | Relative Power (start/finish) |
| 100% 57A TM fused alumina | A (c) | 0.5 | 13.13 | 100 | 100 100 |
| | | 1.0 | 5.61 | 100 | 100 100 |
| 50% 57A TM 30% sol-gel 20% Syenite | C | 0.5 | 50.44 | 384 | 71 83 |
| | | 1.0 | 13.61 | 243 | 83 123 |
| | | 2.0 | 4.65 | 185 | 96 92 |
| 30% sol-gel alumina 70% Syenite | D | 0.5 | 25.53 | 194 | 46 88 |
| | | 1.0 | 10.96 | 195 | 70 100 |
| | | 2.0 | 3.38 | 135 | 104 81 |
| 50% sol-gel alumina 50% Syenite | E | 0.5 | 68.43 | 521 | 50 94 |
| | | 1.0 | 19.79 | 353 | 74 124 |
| | | 2.0 | 6.02 | 240 | 92 81 |
| 30% sol-gel alumina 70% Syenite | G | 0.5 | 67.07 | 511 | 50 94 |
| | | 1.0 | 14.83 | 264 | 78 141 |
| | | 2.0 | 3.79 | 151 | 92 96 |
| 50% sol-gel alumina 50% Syenite | J | 0.6 | 67.69 | 516 | 50 100 |
| | | 1.0 | 19.66 | 350 | 87 112 |
| | | 2.0 | 7.55 | 301 | 100 96 |
| 50% sol-gel alumina 50% bubble alumina | K | 0.5 | 67.59 | 515 | 63 106 |
| | | 1.0 | 44.99 | 802 | 117 153 |
| | | 2.0 | 12.81 | 510 | 116 92 |

*"G-Ratio" is the ratio of the volume of metal removed to the volume of wheel worn away in a given period. The relative G-Ratio takes the G-Ratio for a 57a wheel vs 100 and compares the others to that norm.

57A refers to 57 Alumdum TM which is a fused alumina abrasive and is a product of the Norton Company, Worcester, Mass.

Syenite 333 TM is a friable mined mineral, nepheline syenite, available from Indusmin Division, Havelock, Ontario, Canada. It is predominantly a vitrified alumina silicate.

All percentages are by volume in the above Table 2.

The relative grinding results shown in Table 2 are calculated by dividing the actual value by the value of the standard 57A ™ fused alumina wheel A and multiplying by 100. Thus, all relative values for the standard wheel are equal to .100.

The preferred invention wheel K, whose abrasive portion is composed of 50% by volume sol-gel alumina and 50% by volume bubble alumina, showed a G-ratio 500 to 800% greater than the standard fused alumina wheel A. Power requirements for wheel K were not excessive; in fact, at the heaviest final downfeed wheel K drew slightly less power than standard wheel A.

Wheels C, D, E, G, and J represent another embodiment of the invention in that the diluent for the sol-gel abrasive is a friable silicate particle, in this case, nepheline syenite. From the data in Table 2, the relative G-ratio of these wheels was as much as 516% greater than that of the standard fused alumina wheel A. Wheel J, whose abrasive portion consisted of volume proportions of 50% sol-gel alumina and 50% nepheline syenite, showed a relative G-ratio 516% greater than the standard at the lowest infeed and 300% greater than the standard at the highest infeed without an increase in power.

EXAMPLE 2

A series of six test wheels of the same size as those in Example 1 were prepared from the batch compositions shown in Table 3.

TABLE 3

BATCH WEIGHTS IN POUNDS

| | Wheel marking | | | | |
|---|---|---|---|---|---|
| | 1 (c) | 2 (c) | 3 (c) | 4 | 5 |
| Density | 2.54 | 2.61 | 2.6 | 1.83 | 1.82 |
| 46 grit size seeded sol-gel alumina abrasive | 0 | 0 | 3.48 | 4.94 | 8.27 |
| 46 grit size fused alumina abrasive | 12.14 | 11.18 | 8.31 | 3.36 | 0 |
| Bubble alumina 0.5–10 mm dia. | 0 | 0 | 0 | 2.16 | 2.16 |
| Varcum 29717 ™ powdered phenolic resin | 1.39 | 1.79 | 1.85 | 2.62 | 2.63 |
| Varcum 2930 ™ liquid phenolic resin | 0.22 | 0 | 0 | 0 | 0 |
| Cryolite −200 mesh | 1.27 | 1.16 | 1.20 | 1.70 | 1.71 |
| Chloroflo 40 ™ | 23 cc | 24 cc | 24 cc | 24 cc | 24 cc |
| Furfural | | 80 cc | 81 cc | 114 cc | 115 cc |
| Quicklime | | 0.26 | 0.26 | 0.38 | 0.38 |

Methods of mixing, cold pressing and curing were the same as in Example 1. After finishing the size these test wheels were subjected to the same slot grinding test as in Example 1 with the exception that horsepower was measured by dynamometer. The results of grinding these are shown in Table 4.

TABLE 4

SLOT GRINDING TEST RESULTS

| Abrasive/ Friable Filler | Wheel Marking | Feed (mils) | G Ratio (S/W) | Relative G Ratio | Relative Power |
|---|---|---|---|---|---|
| 100% 57A ™ fused alumina | 1 (c) | 0.5 | 15.37 | 100 | 100 |
| | | 1.0 | 6.37 | 100 | 100 |
| | | 2.0 | 3.10 | 100 | 100 |
| 100% 57A ™ fused alumina | 2 (c) | 0.5 | 18.02 | 117 | 192 |
| | | 1.0 | 9.32 | 146 | 125 |
| | | 2.0 | 5.00 | 161 | 137 |
| 70% 57A ™ fused alumina 30% sol-gel. alumina | 3 (c) | 0.5 | 30.85 | 201 | 149 |
| | | 1.0 | 16.25 | 255 | 125 |
| | | 2.0 | 4.80 | 155 | 93 |
| 20% 57A ™ fused alumina 30% sol-gel alumina 50% bubble Alumina | 4 | 0.5 | 50.13 | 326 | 113 |
| | | 1.0 | 21.70 | 341 | 91 |
| | | 2.0 | 6.43 | 207 | 84 |
| 50% sol-gel alumina 50% bubble alumina | 5 | 0.5 | 81.01 | 527 | 72 |
| | | 1.0 | 38.46 | 604 | 80 |
| | | 2.0 | 16.75 | 540 | 87 |

All percentages given by volume.

Wheels 1, 2 and 3 are for comparative purposes.

The test results of Example 2 as shown in Table 4 again illustrate the marked increase in G-ratio of the preferred invention wheels. Both wheels 3(c) and 4 contain 30% sintered sol-gel alumina abrasive by volume of total abrasive; however, the remainder of the abrasive portion of wheel 3 is 70% fused alumina. Wheel 4, containing 50% bubble alumina, considerably outperforms wheel 3 in both G-ratio and power even though both contain the same volume (30%) of sintered sol-gel alumina. Wheel 5, whose abrasive portion is 50% sintered sol-gel alumina and which contains 50% bubble alumina, outperformed the standard fused alumina wheel by 527 to 604% in G-ratio and drew 13% to 27% less power.

EXAMPLE 3

In this series of test wheels, various blends of sintered sol-gel alumina with fused alumina and bubble alumina were evaluated. The compositions of the mix batches from which these wheels were pressed are given in Table 5.

TABLE 5

BATCH WEIGHTS IN POUNDS

| | Wheel marking | | | | | |
|---|---|---|---|---|---|---|
| | 6 | 7 | 8 | 9 | 10 | 11 |
| Density | 2.37 | 2.02 | 2.01 | 2.00 | 2.09 | 2.00 |
| 46 grit sol-gel alumina | 1.69 | 1.99 | 5.99 | 10.03 | 9.63 | 10.03 |
| 46 grit 57A ™ fused alumina | 12.13 | 8.14 | 4.86 | 0 | 0 | 0 |
| 0.5 mm–1 mm bubble alumina | 1.49 | 4.38 | 4.40 | 4.42 | 4.24 | 4.42 |
| Varcum 29717 ™ powdered | 2.70 | 2.90 | 3.19 | 3.20 | 3.06 | 3.20 |

TABLE 5-continued

| | BATCH WEIGHTS IN POUNDS | | | | | |
|---|---|---|---|---|---|---|
| | Wheel marking | | | | | |
| | 6 | 7 | 8 | 9 | 10 | 11 |
| phenolic resin | | | | | | |
| Cryolite —200 mesh | 1.75 | 1.88 | 2.06 | 2.07 | 0 | 2.07 |
| Iron pyrites | 0 | 0 | 0 | 0 | 2.39 | 0 |
| Potassium sulfate | 0 | 0 | 0 | 0 | 0.45 | 0 |
| Chloroflo 40 TM | 32 cc | 32 cc | 32 cc | 32 cc | 32 cc | 32 cc |
| Furfural | 118 cc | 126 cc | 139 cc | 139 cc | 154 cc | 139 cc |
| Quicklime | 0.39 | 0.42 | 0.46 | 0.46 | 0.44 | 0.46 |

Methods of mixing, cold pressing and curing were the same as in Example 1. After finishing to size these test wheels were subjected to the same slot grinding test as in Example 1 with the exception that horsepower was measured by dynamometer. The results of the grinding test are shown in Table 6.

TABLE 6

SLOT GRINDING TEST RESULTS

| Abrasive/ Friable Filler | Wheel Marking | Feed (mils) | G Ratio (S/W) | Relative G Ratio | Relative Power |
|---|---|---|---|---|---|
| 70% 57A TM fused alumina 10% sol-gel alumina 20% bubble alumina | 6 | 0.5 1.0 2.0 | 22.79 11.49 2.44 | 148 180 79 | 105 93 89 |
| 40% 57A TM fused alumina 10% sol-gel alumina 50% bubble alumina | 7 | 0.5 1.0 2.0 | 26.40 10.70 3.86 | 172 168 124 | 92 91 75 |
| 20% 57A TM fused alumina 30% sol-gel alumina 50% bubble alumina | 8 | 0.5 1.0 2.0 | 65.58 22.67 5.14 | 427 356 166 | 73 79 63 |
| 50% sol-gel alumina 50% bubble alumina (cryolite filler) | 9 | 0.5 1.0 2.0 | 107.47 48.93 8.54 | 699 768 275 | 57 77 65 |
| 50% sol-gel alumina 50% bubble alumina (iron pyrites + K2SO4 fillers) | 10 | 0.5 1.0 2.0 | 91.49 45.31 9.92 | 595 711 320 | 60 74 69 |
| 50% sol-gel alumina 50% bubble alumina (both silane treated) | 11 | 0.5 1.0 | 67.01 45.49 | 436 714 | 59 69 |

All percentages are by volume.

The grinding test results from Example 3 again show the unexpectedly large increase in G-ratio obtained from combinations of sintered sol-gel alumina and alumina bubbles and other embodiments of the invention. Wheels 9, 10, and 11 which contain 50% sintered sol-gel alumina and 50% alumina bubbles by volume of the abrasive portion gave G-ratios 275% to 768% greater than a standard wheel containing 100% fused alumina. The power expended in grinding was 25% to 40% less for the invention wheel indicating that the invention wheel is much more efficient and would be less likely to cause metallurgical damage to the workpiece.

EXAMPLE 4

The following results were obtained in a commercial hot mill roll grinding operation. The rolls were of high chromeiron and the grinding was done at essentially constant full power. The results obtained are set forth in Table 7 below.

TABLE 7

| Wheel | Abrasive* | Total Metal Remove (in.) | Relative G Ratio | Metal Removal Rate | Comments |
|---|---|---|---|---|---|
| 12 | 50% 57A TM 50% Black SiC | 1.7 | 100% | 100% | Chatter |
| 13 | 20% Sol-Gel Alumina 80% Green SiC | 4.1 | 240% | 125% | No Chatter |
| 14 | 20% Sol Gel Alumina | 5.2 | 310% | 250% | No Chatter |

TABLE 7-continued

| Wheel | Abrasive* | Total Metal Remove (in.) | Relative G Ratio | Metal Removal Rate | Comments |
|---|---|---|---|---|---|
| | 60% Green Sic 20% Bubble Alumina | | | | |

*Percentages are by volume of total particulate (abrasive and friable filler) in the wheel.

By replacing 20% of SiC (silicon carbidee) with bubble alumina (Wheel 14 compared to Wheel 13) resulted in a large improvement in both Metal Removal Rate and G Ratio. This is a highly unusual result because, normally, improvements in G Ratio are gained at the expense of metal removal rate—and vice versa.

The embodiments disclosed herein are illustrative of the unexpectedly high G-ratios obtainable when hollow oxide spheres or friable particles are incorporated into abrasive bodies whose abrasive portion is wholly or in part composed of sintered sol-gel alumina grits and such embodiments are not in any way limiting.

Obviously minor changes may be made in the form and construction of this invention without departing from its spirit. Thus, it is not desired to confine the invention to the exact form shown and described, but it is desired to include all such as properly come within the scope claimed.

We claim:

1. An abrasive article comprising particulate material held in a resinous bond wherein:
   a. The particulate material comprises from about 30% to about 95% by volume of abrasive particles and correspondingly from about 5 to about 70% by volume of friable filler particles selected from hollow bubbles of a metal oxide, an organic polymer or a glass, friable particles of a silicate or an aluminosilicate, and foamed or solid glass or organic polymer particles; and
   b. the abrasive particles comprise particles of a sintered sol-gel alumina and particles of at least one further abrasive material.

2. An abrasive article according to claim 1 in which at least 10% of the volume of the abrasive particles in the article is supplied by sintered sol gel alumina particles.

3. An abrasive article according to claim 2 in which at least 50% of the volume of the abrasive particles in the article is supplied by sintered sol gel alumina particles.

4. An abrasive article according to claim 1 in which the sol gel alumina particles are seeded sol gel alumina particles.

5. An abrasive article according to claim 1 in which up to 70% of the volume of the abrasive particles is provided by particles of fused or sintered alumina, silicon carbide, fused or sintered zirconia, fused or sintered alumina-zirconia, diamond or CBN.

6. An abrasive article according to claim 1 in which the friable filler particles provide from about 20 to 70% of the volume of particulate matter in the article.

7. An abrasive article according to claim 1 in which the friable filler particles are selected from aluminum oxide bubbles, zirconia oxide bubbles, glass bubbles, and vitrified alumina-silicate bubbles or pellets.

8. An abrasive article according to claim 1 in which the resin bond is provided by a phenolic resin.

9. An abrasive article comprising particulate material held in a resinous bond wherein:
   a. the particulate material comprises from about 30 to about 80% by volume of abrasive particles and correspondingly from about 70 to about 20% by volume of friable filler particles;
   b. the abrasive particles comprise from about 20 to about 90 volume % of seeded sol-gel alumina particles;
   c. the friable filler particles are bubble alumina; and
   d. the resinous bond material is a phenolic resin.

10. An abrasive article according to claim 9 in which the sol gel alumina particles each comprise a multitude of crystallites having a diameter of from about 0.4 micron or less.

11. An abrasive article according to claim 9 in which up to about 80% by volume of the abrasive particles are provided by fused alumina particles.

12. An abrasive article according to claim 9 in which the alumina bubbles have a mesh size of from about 10 to about 200 mesh.

13. An abrasive article according to claim 1 in the form of an abrasive wheel having a substantially uniform structure throughout.

14. An abrasive article according to claim 9 in the form of an abrasive wheel having a substantially uniform structure throughout.

15. An abrasive article according to claim 10 in the form of an abrasive wheel having a substantially uniform structure throughout.

16. A method of forming an abrasive article which comprises:
   a. forming a uniform mixture comprising particulate material and a curable resin bond material wherein the particulate material comprises from about 30% to about 80% by volume of abrasive particles and from about 70% to about 30% by volume of friable filler particles selected from the group consisting of hollow bubbles of a metal oxide, an organic polymer or a glass, friable particles of a silicate or an aluminosilicate, and foamed or solid glass or organic polymer particles; wherein at least about 30% of the volume of the abrasive particles is provided by a seeded sol-gel alumina and at least about 10% is provided by another abrasive material;
   b. shaping the mixture into the form of the desired article; and
   c. curing the resin bond.

* * * * *

UNITED STATES PATENT AND TRADEMARK OFFICE
CERTIFICATE OF CORRECTION

PATENT NO. : 5,110,322

DATED : May 5, 1992

INVENTOR(S) : Kesh S. Narayanan, et al.

It is certified that error appears in the above-identified patent and that said Letters Patent is hereby corrected as shown below:

Column 10, line 54, delete "a".
Column 10, line 55, delete "hot mill roll" and "operation. The rolls were".
Column 10, line 56, delete "chromeiron and the grinding was done" and substitute -- chrome iron--.

Signed and Sealed this

Thirtieth Day of November, 1993

Attest:

BRUCE LEHMAN

*Attesting Officer*

*Commissioner of Patents and Trademarks*

(12) EX PARTE REEXAMINATION CERTIFICATE (6158th)
United States Patent
Narayanan et al.

(10) Number: US 5,110,322 C1
(45) Certificate Issued: *Mar. 25, 2008

(54) ABRASIVE ARTICLE

(75) Inventors: Kesh S. Narayanan, Holden, MA (US);
Muni S. Ramakrishnan, Northborough, MA (US)

(73) Assignee: Norton Company, Worcester, MA (US)

Reexamination Request:
No. 90/007,529, Apr. 29, 2005

Reexamination Certificate for:
Patent No.: 5,110,322
Issued: May 5, 1992
Appl. No.: 07/506,059
Filed: Apr. 9, 1990

(*) Notice: This patent is subject to a terminal disclaimer.

Certificate of Correction issued Nov. 30, 1993.

Related U.S. Application Data

(63) Continuation-in-part of application No. 07/406,487, filed on Sep. 13, 1989, now Pat. No. 5,037,453.

(51) Int. Cl.
| | |
|---|---|
| *B24D 3/34* | (2006.01) |
| *B24D 3/20* | (2006.01) |
| *B24D 3/28* | (2006.01) |
| *B24D 3/02* | (2006.01) |
| *C09K 3/14* | (2006.01) |
| *C09C 1/68* | (2006.01) |

(52) U.S. Cl. .................... 51/309; 51/293; 51/295; 51/298; 51/307; 51/308

(58) Field of Classification Search .................. None
See application file for complete search history.

(56) References Cited

U.S. PATENT DOCUMENTS

| | | |
|---|---|---|
| 1,524,134 A | 1/1925 | Hutchins |
| 1,830,757 A | 11/1931 | Hartmann |
| 1,956,905 A | 2/1934 | Merriam |
| 1,986,805 A | 1/1935 | Gebhard |
| 2,806,772 A | 9/1957 | Robie |
| 2,986,455 A | 5/1961 | Sandmeyer |
| 3,079,243 A | 2/1963 | Ueltz |
| 3,329,488 A | 7/1967 | Cofran |
| 3,387,957 A | 6/1968 | Howard |
| 3,661,544 A | 5/1972 | Noble |
| 3,909,991 A | 10/1975 | Coes |
| 4,226,602 A | 10/1980 | Fukuda |
| 4,314,827 A | 2/1982 | Leitheiser et al. |
| 4,588,419 A | 5/1986 | Caul |
| 4,734,104 A | 3/1988 | Broberg |
| 4,744,802 A | 5/1988 | Schwabel |
| 4,770,671 A | 9/1988 | Monroe |
| 4,786,292 A | 11/1988 | Janz |
| 4,799,939 A | 1/1989 | Bloecher |
| 4,881,951 A | 11/1989 | Wood et al. |
| 4,898,597 A | 2/1990 | Hay |
| 4,997,461 A | 3/1991 | Markhoff-Matheny |
| 5,034,360 A | 7/1991 | Bartels |
| 5,035,723 A | 7/1991 | Kalinowski et al. |
| 5,129,919 A | 7/1992 | Kalinowski |
| 5,164,348 A | 11/1992 | Wood |
| 5,312,789 A | 5/1994 | Wood |
| 5,453,104 A | 9/1995 | Schwabel |

FOREIGN PATENT DOCUMENTS

EP 0 280 463 A2 8/1988

OTHER PUBLICATIONS

Defendant's Motion for More Definite Statement and/or Stay, *Saint–Gobain Abrasives, Inc. v. Radiac Abrasives, Inc.*, Case No. 06–40056 FDS (U.S. District Court, District of Massachusetts), filed May 11, 2006.

Memorandum in Support of Defendant's Motion for More Definite Statement and/or Stay, Exhibits A, B & C, *Saint–Gobain Abrasives, Inc. v. Radiac Abrasives, Inc.*, Case No. 06–40056 FDS (U.S. District Court, District of Massachusetts), filed May 12, 2006.

First Amended Complain and Jury Demand, *Saint–Gobain Abrasives, Inc. v. Radiac Abrasives, Inc.*, Case No. 06–40056 FDS (U.S. District Court, District of Massachusetts), filed May 25, 2006.

Defendant's Reply to Plaintiff's Opposition to Stay, *Saint-Gobain Abrasives, Inc.* v. *Radiac Abrasives, Inc.*, Case No. 06–40056 FDS (U.S. District Court, District of Massachusetts), filed Jun. 6, 2006.
Answer, Counterclaim and Jury Demand, *Saint-Gobain Abrasives, Inc.* v. *Radiac Abrasives, Inc.*, Case No. 06–40056 FDS (U.S. District Court, District of Massachusetts), filed Jun. 9, 2006.
Plaintiff's Reply to Defendant's Counterclaim, *Saint-Gobain Abrasives, Inc.* v. *Radiac Abrasives, Inc.*, Case No. 06–40056 FDS (U.S. District Court, District of Massachusetts), filed Jun. 21, 2006.
Plaintiff's Response to Supplemental Memorandum in Support of Defendant's Motion for More Definite Statement and/or Stay, *Saint-Gobain Abrasives, Inc.* v. *Radiac Abrasives, Inc.*, Case No. 06–40056 FDS (U.S. District Court, District of Massachusetts), filed Aug. 29, 2006.
Settlement Order of Dismissal, Case No. 06–40056–FDS (U.S. District Court, District of Massachusetts), dated Jan. 4, 2007.
Coes, L., Abrasives, New York, 1971, as provided by Noritake Co., Ltd., (pp. 17–19).
Extended partial translation of JP–A–62–251077 as provided by Noritake Co., Limited, Sep. 9, 1997, (11 pages).
Translation of JP–A–54–13090 as provided by Noritake Co., Limited, Feb. 7, 1996, (10 pages).
Dodd, A. E., Concise Encylopaedic Dictionary of Ceramics, as provided by Noritake Co., Ltd., 1967, (pages v, 208–209).
Partial translation of JP–A–55–137887 as provided by Noritake Co., Limited, Nov. 2, 1995, (3 pages).
Partial translation of JP–A–59–107859 as provided by Noritake Co., Limited, Nov. 2, 1995, (6 pages).
Translation of JP–B–37–746 as provided by Noritake Co., Limited, Feb. 7, 1996, (6 pages).
Partial translation of JP–A–57–21270 as provided by Noritake Co., Limited, (5 pages).
Kirk–Othmer, Encyclopedia of Chemical Technology, Second Edition, vol. 18, as provided by Noritake Co., Ltd., Oct. 11, 1996 (pp. 318–319).
Notice of Opposition of EP–B–418738 and Statement in Support by Minnesota Mining and Manufacturing Co., Oct. 25, 1995, (27 pages).
Notice of Opposition of EP–B–418738 and Statement in Support by Noritake Co., Ltd. Oct. 25, 1995, (16 pages).
Response by Norton Company to Notices of Opposition of EP–B–418738, Oct. 11, 1996, (24 pages).
Request for Correction of Error in Response to Notices of Opposition of EP–B–418738 by Norton Company, Jan. 22, 1997, (4 pages).
Provisional Opinion f the Opposition Division in the Oppositions of EP–B–418738, Feb. 6, 1997 (4 pages).
Amended Statement of Opposition to EP–B–418738 by Noritake Co., Ltd., Aug. 11, 1997 (13 pages).
Reply to Response of Norton Company by Minnesota Mining and Manufacturing Co., Sep. 9, 1997, (12 pages).
Response by Norton Co., to the Provisional Opinion of the Opposition Division, Sep. 9, 1997 (27 pages).
Supplementary Statement of Opposition to EP–B–418738 by Noritake Co., Ltd., Sep. 9, 1997, (35 pages).
Decision Revoking the European Patent, Dec. 12, 1997, (24 pages).
Minutes of the Oral Proceeding Before the Opposition Division, Dec. 12, 1997, (8 pages).
Notice of Appeal from the Decision Revoking the European Patent, Feb. 12, 1998, (1 page).
Grounds for Appeal in Response to the Decision of the Opposition Division by Norton Co., Apr. 22, 1998, (20 pages).
Observations in Response to the Grounds for Appeal by Noritake Co., Ltd., Nov. 17, 1998, (16 pages).
Reply to the Grounds for Appeal by Minnesota Mining and Manufacturing Co., Nov. 18, 1998, (21 pages).
Provisional Opinion of the Board of Appeal of the European Patent Office, Apr. 4, 2001, (5 pages).
Response by Norton Co. to the Provisional Opinion of the Board of Appeal of the European Patent Office, Nov. 9, 2001, (34 pages).
Declaration of Dr. Ernie Duwell in Support of the Opposition to EP–B–418738 by Minnesota Mining and Manufacturing Co., Nov. 15, 2001 (3 pages).
Decision of the Technical Board of Appeal Regarding the Opposition of EP–B–418738, Dec. 11, 2001, (23 pages).
Minutes of the Oral Proceedings before the Technical Board of Appeal, Dec. 11, 2001, (4 pages).
Notice of Reasons for Cancellation of JP–2523971, Jul. 28, 1997, (15 pages).
Proposed Corrected Claims for JP–2523971, Sep. 30, 1998, (2 pages).
Decision Regarding Filing of Patent Opposition of JP–2523971, Feb. 19, 1999, (20 pages).
Plaintiff's Preparatory Document (1), *Norton Co., v. Commissioner of the Patent Office*, The Tokyo High Court, Civil Department 18, Oct. 26, 1999, (29 pages).
Defendant's Rebuttal to Plaintiff's Preparatory Document (1), *Norton Co., v. Commissioner of the Patent Office*, The Tokyo High Court, Civil Department 18, Dec. 17, 1999, (39 pages).
Plaintiff's Preparatory Documet (3), *Norton Co., v. Commissioner of the Patent Office*, The Tokyo High Court, Civil Department 18, Mar. 2, 2000, (44 pages).
Plaintiff's Preparatory Documet (4), *Norton Co., v. Commissioner of the Patent Office*, The Tokyo High Court, Civil Department 18, May 31, 2000, (23 pages).
Defendant's Preparatory Document (2), *Norton Co., v. Commissioner of the Patent Office*, The Tokyo High Court, Civil Department 18, Jun. 29, 2000, (30 pages).
Intervenor's Preparatory Documet (1st), *Norton Co., v. Commissioner of the Patent Office*, The Tokyo High Court, Civil Department 18, Jul. 11, 2000, (38 pages).
Intervenor's Preparatory Documet (2), *Norton Co., v. Commissioner of the Patent Office*, The Tokyo High Court, Civil Department 18, Jan. 23, 2001, (28 pages).
Decision of the Tokyo High Court, Civil Department 18, *Norton Co., v. Commissioner of the Patent Office*, The Tokyo High Court, Civil Department 18, May 30, 2002, (17 pages).
Complaint and Jury Demand, *Saint–Gobain Abrasives, Inc.* v. *Radiac Abrasives, Inc.*, Case No. 4:06–cv–40056–FDS, (U.S. District Court, District of Massachusetts), filed Mar. 22, 2006 (6 pages).
Sales Letter: From Morris I. Pollack, Senior Counsel, Western Atlas, Apr. 9, 1997, addressed to Mary Porter, counsel for Norton.
Book Excerpt: *CRC Handbook of Chemistry and Physics*, $79^{th}$ ed., New York: CRC Press, 1998, p. 4–38, (No. 40).

*Primary Examiner*—Stephen Stein

(57) ABSTRACT

Abrasive article using sintered sol-gel abrasive particles mixed with other particles having greater friability, and carried in a bond.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9 and 16 are determined to be patentable as amended.

Claims 2–8 and 10–15, dependent on an amended claim, are determined to be patentable.

1. An abrasive article comprising particulate material held in a resinous bond wherein:
   a. The particulate material comprises from about 30% to about 95% by volume of abrasive particles and correspondingly from about 5 to about 70% by volume of friable filler particles selected from hollow bubbles of a metal oxide, an organic polymer or a glass, friable particles of a silicate or an aluminosilicate, and foamed or solid glass or organic polymer particles; and
   b. the abrasive particles comprise particles of a sintered sol-gel alumina and particles of at least one further abrasive material, *wherein the filler particles have greater friability than the sintered sol-gel alumina particles*.

9. An abrasive article comprising particulate material held in a resinous bond wherein:
   a. the particulate material comprises from about 30 to about 80% by volume of abrasive particles and correspondingly from about 70 to about 20% by volume of friable filler particles;
   b. the abrasive particles comprise from about 20 to about 90 volume % of seeded sol-gel alumina particles;
   c. the friable filler particles are bubble alumina *and have greater friability than the sol-gel alumina particles*; and
   d. the resinous bond material is a phenolic resin.

16. A method of forming an abrasive article which comprises:
   a. forming a uniform mixture comprising particulate material and a curable resin bond material wherein the particulate material comprises from about 30% to about 80% by volume of abrasive particles and from about 70% to about 30% by volume of friable filler particles selected from the group consisting of hollow bubbles of a metal oxide, an organic polymer or a glass, friable particles of a silicate or an aluminosilicate, and foamed or solid glass or organic polymer particles; wherein at least about 30% of the volume of the abrasive particles is provided by a seeded sol-gel alumina and at least about 10% is provided by another abrasive material, *the filler particles having friability greater than that of the seeded sol-gel alumina*;
   b. shaping the mixture into the form of the desired article; and
   c. curing the resin bond.

* * * * *

(12) EX PARTE REEXAMINATION CERTIFICATE (6670th)
United States Patent
Narayanan et al.

(10) Number: US 5,110,322 C2
(45) Certificate Issued: Feb. 17, 2009

(54) ABRASIVE ARTICLE

(75) Inventors: Kesh S. Narayanan, Holden, MA (US);
Muni S. Ramakrishnan, Northborough, MA (US)

(73) Assignee: Saint-Gobain Abrasives, Inc., Worcester, MA (US)

Reexamination Request:
No. 90/008,660, Jun. 21, 2007

Reexamination Certificate for:
Patent No.: 5,110,322
Issued: May 5, 1992
Appl. No.: 07/506,059
Filed: Apr. 9, 1990

Reexamination Certificate C1 5,110,322 issued Mar. 25, 2008

Certificate of Correction issued Nov. 30, 1993.

Related U.S. Application Data

(63) Continuation-in-part of application No. 07/406,487, filed on Sep. 13, 1989, now Pat. No. 5,037,453.

(51) Int. Cl.
*B24D 3/02* (2006.01)
*B24D 3/034* (2006.01)
*B24D 3/028* (2006.01)
*C09K 3/014* (2006.01)

(52) U.S. Cl. ............ 51/309; 51/293; 51/295; 51/298; 51/307; 51/308

(58) Field of Classification Search .............. None
See application file for complete search history.

(56) References Cited

U.S. PATENT DOCUMENTS

| | | | |
|---|---|---|---|
| 1,524,134 A | 1/1925 | Hutchins |
| 1,830,757 A | 11/1931 | Hartmann |
| 1,956,905 A | 2/1934 | Merriam |
| 1,986,805 A | 1/1935 | Gebhard |
| 2,806,772 A | 9/1957 | Robie |
| 2,986,455 A | 5/1961 | Sandmeyer |
| 3,079,243 A | 2/1963 | Ueltz |
| 3,329,488 A | 7/1967 | Cofran |
| 3,387,957 A | 6/1968 | Howard |
| 3,661,544 A | 5/1972 | Noble |
| 3,909,991 A | 10/1975 | Coes |
| 4,226,602 A | 10/1980 | Fukuda |
| 4,314,827 A | 2/1982 | Leitheiser et al. |
| 4,588,419 A | 5/1986 | Caul |
| 4,734,104 A | 3/1988 | Broberg |
| 4,744,802 A | 5/1988 | Schwabel |
| 4,770,671 A | 9/1988 | Monroe |
| 4,786,292 A | 11/1988 | Janz |
| 4,799,939 A | 1/1989 | Bloecher |
| 4,881,951 A | 11/1989 | Wood et al. |
| 4,898,597 A | 2/1990 | Hay |
| 4,997,461 A | 3/1991 | Markhoff-Matheny |
| 5,009,676 A | 4/1991 | Rue et al. |
| 5,034,360 A | 7/1991 | Bartels |
| 5,129,919 A | 7/1992 | Kalinowski |
| 5,164,348 A | 11/1992 | Wood |
| 5,312,789 A | 5/1994 | Wood |
| 5,453,104 A | 9/1995 | Schwabel |

FOREIGN PATENT DOCUMENTS

EP 0 280 463 A2 8/1988

OTHER PUBLICATIONS

Coes, L., *Abrasives*, New York, 1971, as provided by Noritake Co., Ltd., (pp. 17–19).
Extended partial translation of JP–A–62–251077 as provided by Noritake Co., Limited, Sep. 9, 1997, (11 pages).
Translation of JP–A–54–13090 as provided by Noritake Co., Limited, Feb. 7, 1996, (10 pages).
Dodd, A. E., *Concise Encyclopaedic Dictionary of Ceramics*, as provided by Nor ake Co., Ltd., 1967, (pp. v, 208–209).
Partial translation of JP–A–55–137887 as provided by Noritake Co., Limited, Nov. 2, 1995, (3 pages).
Partial translation of JP–A–59–107859 as provided by Noritake Co., Limited, Nov. 2, 1995, (6 pages).
Translation of JP–B–37–746 as provided by Noritake Co., Limited, Feb. 7, 1996, (6 pages).
Partial translation of JP–A–57–21270 as provided by Noritake CoLimited, (5 pages).
Kirk,–Othmer, *Encyclopedia of Chemical Technology, Second Edition*, vol. 18, as provided by Noritake Co., Ltd., Oct. 11, 1996 (pp. 318–319).
Book Excerpt: *CRC Handbook of Chemistry and Physics*, 79th ed., New York: CRC Press, 1998, p. 4–38 (No. 40).

*Primary Examiner*—Jerry D. Johnson

(57) ABSTRACT

Abrasive article using sintered sol-gel abrasive particles mixed with other particles having greater friability, and carried in a bond.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 and 13 is confirmed.

Claims 9–12 and 14–16 were not reexamined.

* * * * *